Patented July 7, 1925.

1,544,707

UNITED STATES PATENT OFFICE.

ALBERT WEBER, OF BALTIMORE, MARYLAND.

METHOD OF PRODUCING GREEN-MOSS-COVERED MASONRY.

No Drawing. Application filed October 29, 1923. Serial No. 671,371.

*To all whom it may concern:*

Be it known that I, ALBERT WEBER, a citizen of the United States of America, residing in the city of Baltimore, State of Maryland, have invented certain new and useful Improvements in Methods of Producing Green-Moss-Covered Masonry, of which the following is a specification.

Flagstone floors and walks, and other masonry structures of considerable age, have been regarded as of high artistic merit largely on account of the growth of a green moss covering the mortar filled joints in the structure and thus producing a design in moss green on the gray brown stone or brick or tile.

The object of the present invention is to produce this same artistic effect by filling the joints with a specially compounded mortar which by proper treatment is caused to produce within a few weeks or months a growth of green moss, exactly similar to that which is found on the joints of masonry structures of great age.

The invention relates to the method of filling the joints in masonry structures and treating this filling to produce an immediate growth of green moss on the joint filling substance.

A mortar made in accordance with the following formula devised by the applicant is in regular use by him in the construction of ornamental masonry structures, and when treated in accordance with the method of my invention, it has been found exceedingly effective in that the mortar filled joints, when properly treated as hereinafter outlined, assume, within two or three months a beautiful greenish shade which harmonizes with the grays and browns of the stone, tiles and flags used for these purposes, the color being due to the growth of a green moss on the mortar.

The preferred formula of the mortar consists of one part in bulk of hydrated lime, one part fine rich loam, one part trap rock stone dust, and ten per cent of one part washed sand. In some instances a small quantity as ten per cent of Portland cement or the like, may be used for greater hardness, though this has a slight detrimental effect as to the growth of the moss. Also the loam and stone may be reduced in quantity, and gray stone, rotten rock, otherwise known as disintegrated gray stone, about twenty-five per cent, substituted.

The various constituents, which are capable of variation as to nature and proportion, are thoroughly mixed together in a dry state and moistened by adding sufficient water to make a mortar or paste, the best practice being to use such mortar for joints over one inch in width, and for closer joints where there is less than one inch space to be filled, the ingredients should be applied in a dry state well pressed in and then wet. The joints thus filled will grow a green moss in the course of two or three months after filling. To produce this result, however, it is desirable to spray the filled joints with water once or twice a day during hot dry weather, and to keep them at least partially shaded.

My invention also includes the method of producing moss lawns in shady spots where there is shade all day or three-fourths of the time. For this purpose it is used in a dry state, spread about two inches deep on top soil and brought to the desired grade. To produce a moss lawn in this way the preparation should be sprayed once or twice a day in hot and dry weather.

I have thus described specifically and in detail a method of producing green moss-colored joints in masonry structures and the like in accordance with my invention; in order that the nature of the invention may be clearly understood, however, the specific terms herein are used descriptively rather than in a limiting sense, the scope of the invention being defined in the claim.

What I claim and desire to secure by Letters Patent is:

The method of producing an immediate growth of moss covering the mortar filled joints of masonry structures which consists in filling the joints with a mortar containing a moss-bearing material, and treating the joint filler with water at relatively short intervals until the growth is established.

Signed by me at Baltimore, Maryland, this 23rd day of October, 1923.

ALBERT WEBER.

Witnesses:
PORTER H. FLAUTT,
E. WEHMEYER.